(12) United States Patent
Katou

(10) Patent No.: US 11,520,672 B2
(45) Date of Patent: Dec. 6, 2022

(54) ANOMALY DETECTION DEVICE, ANOMALY DETECTION METHOD AND STORAGE MEDIUM

(71) Applicants: Kabushiki Kaisha Toshiba, Minato-ku (JP); Toshiba Digital Solutions Corporation, Kawasaki (JP)

(72) Inventor: Toshiyuki Katou, Yokohama (JP)

(73) Assignees: Kabushiki Kaisha Toshiba, Tokyo (JP); Toshiba Digital Solutions Corporation, Kawasaki (JP)

( * ) Notice: Subject to any disclaimer, the term of this patent is extended or adjusted under 35 U.S.C. 154(b) by 577 days.

(21) Appl. No.: 16/582,338

(22) Filed: Sep. 25, 2019

(65) Prior Publication Data

US 2020/0104224 A1 Apr. 2, 2020

(30) Foreign Application Priority Data

Sep. 27, 2018 (JP) .............................. JP2018-181533

(51) Int. Cl.

| G06F 9/46 | (2006.01) |
|---|---|
| G06F 11/30 | (2006.01) |
| G06F 11/32 | (2006.01) |
| G06N 3/04 | (2006.01) |
| G06F 17/16 | (2006.01) |

(Continued)

(52) U.S. Cl.
CPC ............ *G06F 11/302* (2013.01); *G06F 9/542* (2013.01); *G06F 11/321* (2013.01); *G06F 17/16* (2013.01); *G06K 9/6256* (2013.01); *G06N 3/02* (2013.01); *G06N 3/04* (2013.01); *G06F 2101/14* (2013.01)

(58) Field of Classification Search
CPC ...... G06F 11/302; G06F 9/542; G06F 11/321; G06F 17/16; G06K 9/6256; G06N 3/02
See application file for complete search history.

(56) References Cited

U.S. PATENT DOCUMENTS 10,223,403 B2  3/2019  Malhotra et al.
2016/0359993 A1*  12/2016  Hendrickson ......... G06F 16/951
(Continued)

FOREIGN PATENT DOCUMENTS

| JP | 7-219623 A | 8/1995 |
| JP | 2016-201088 A | 12/2016 |

OTHER PUBLICATIONS

John Skilling ; Kevin H Knuth; The symmetrical foundation of Measure, Probability and Quantum theories; 2018.*

(Continued)

*Primary Examiner* — Camquy Truong
(74) *Attorney, Agent, or Firm* — Maier & Maier, PLLC

(57) ABSTRACT

An anomaly detection device according to the embodiment includes a prediction unit and an anomaly score calculation unit. The prediction unit performs a process to obtain, at each time step of the time series data of m dimensions, distribution parameters required to express a continuous probability distribution representing a distribution state of predicted values that can be obtained at a time step t of the time series data of m dimensions. The anomaly score calculation unit performs a process to calculate, using distribution parameters obtained by the prediction unit, an anomaly score corresponding to an evaluation value representing evaluation of a magnitude of anomaly in an actual measurement value at the time step t of time series data of m dimensions.

11 Claims, 9 Drawing Sheets

(51) Int. Cl.
  *G06K 9/62* (2022.01)
  *G06F 9/54* (2006.01)
  *G06N 3/02* (2006.01)

(56) References Cited

U.S. PATENT DOCUMENTS

2018/0300882 A1* 10/2018 Kim ................. G06V 10/26
2020/0104224 A1*  4/2020 Katou ............... G06F 11/302

OTHER PUBLICATIONS

Malhotra, P, et al. "Long Short Term Memory Networks for Anomaly Detection in Time Series". ESANN 2015 proceedings, Bruges (Belgium), pp. 22-24. Apr. 2015.
Tsuyoshi Ide, "Introduction to Anomaly Detection using Machine Learning—A Practical Guide with R-", 3rd Edition, Corona Publishing Co., Ltd., Jan. 16, 2016, pp. 17-19 (with Machine English Translation).

* cited by examiner

ANOMALY DETECTION DEVICE, ANOMALY DETECTION METHOD AND STORAGE MEDIUM

CROSS REFERENCE TO RELATED APPLICATION

This application is based upon and claims the benefit of priority from the prior Japanese Patent Application No, 2018-181533 filed on Sep. 27, 2018; the entire contents of which are incorporated herein by reference.

FIELD

An embodiment disclosed herein relates to an anomaly detection device, an anomaly detection method and a storage medium.

BACKGROUND

A method has been known to determine the presence or absence of anomaly in a device or instrument, etc. to be monitored based on data actually obtained by a sensor attached to the monitored device or instrument, etc. with the use of an autoregressive model obtained by modelling time series data.

A method using machine learning has also been known as a method to model nonlinear time series data to realize training of parameters used in processing of respective nodes included in a neural network including, for example, LSTM (long short term memory).

However, in a case as an example where characteristics of noise included in actually obtained data vary time-sequentially, a problem arises in these conventionally known methods that determination accuracy in determination of the presence or absence of anomaly from such data deteriorates.

DETAILED DESCRIPTION

An embodiment aims at providing an anomaly detection device, anomaly detection method and a storage medium in order to enable determination of the presence or absence of anomaly with high accuracy from actually obtained data even if characteristics of noise included in the data vary time-sequentially.

The anomaly detection device according to the embodiment is configured to detect presence or absence of anomaly from time series data of m (m−1) dimensions including T (T≥2) actual measurement values obtained by actually measuring a physical quantity that is a measurement object, and include a prediction unit and an anomaly score calculation unit. The prediction unit is configured to perform a process, at each time step of the time series data of m dimensions, to obtain distribution parameters required to express a continuous probability distribution representing a distribution state of predicted values that can be obtained at a time step t (1≤t≤T) of the time series data of m dimensions. The anomaly score calculation unit is configured to perform, using the distribution parameters obtained by the prediction unit, a process to calculate an anomaly score corresponding to an evaluation value representing evaluation of a magnitude of anomaly in an actual measurement value at the time step t of the time series data of m dimensions.

The embodiment is explained below with reference to the drawings.

Figure 1:
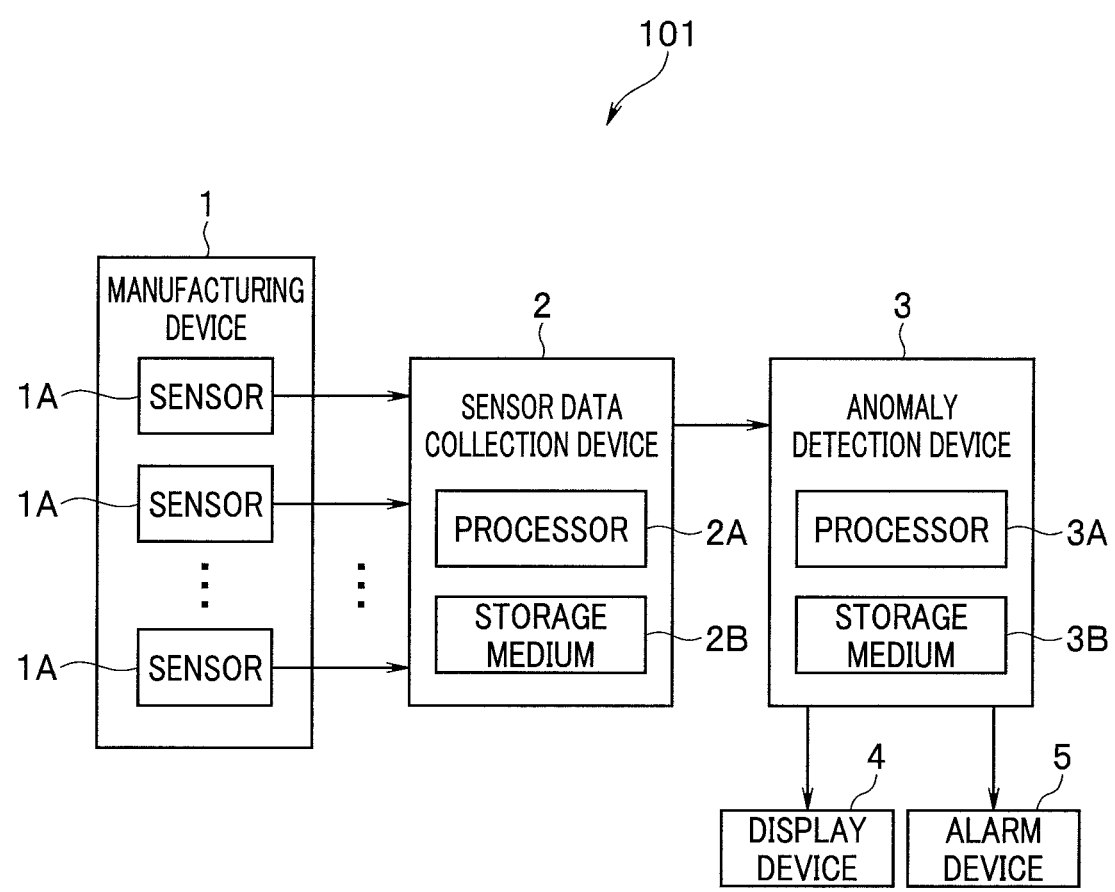
FIG. 1 shows an example of a configuration of a monitor system including an anomaly detection device according to an embodiment.

A monitor system 101 is composed of a manufacturing device 1, a sensor data collection device 2, an anomaly detection device 3, a display device 4 and an alarm device 5 as shown in FIG. 1. FIG. 1 shows an example of a configuration of the monitor system including the anomaly detection device according to the embodiment.

The manufacturing device 1 is configured as a device for manufacturing a predetermined product that is, for example, a semiconductor. The manufacturing device 1 also has at least one sensor 1A attached to measure a physical quantity that is a measurement object at manufacturing step of the predetermined product.

The sensor 1A is composed of any of various sensors including, for example, a vibration sensor, a voltage sensor, a temperature sensor and an electrostatic capacitance sensor. The sensor 1A is also configured to generate a signal indicating a sensor value obtained by measuring a predetermined kind of a physical quantity and to output the generated signal to the sensor data collection device 2. Note that according to the present embodiment, a plurality of sensors 1A attached to the manufacturing device 1 may be used to measure only one kind of a physical quantity as a measurement object or to measure several kinds of physical quantities that are different from each other as subjects of measurement. Additionally, according to the present embodiment, the plurality of sensors 1A attached to the manufacturing device 1 may be partially used to measure the same kind of physical quantity as a measurement object.

The sensor data collection device 2 is configured as a computer including, for example, at least one processor 2A and a storage medium 2B. The sensor data collection device 2 is also configured to accumulate, as sensor data, a plurality of time series sensor values (actual measurement values) indicated by signals outputted from the sensor 1A. Namely, sensor data accumulated in the sensor data collection device 2 includes sensor values (actual measurement values) obtained by actually measuring at least one kind of a physical quantity as a measurement object. Sensor data accumulated in the sensor data collection device 2 also has nonlinear time dependency.

Note that according to the resent embodiment, a configuration may also be adopted in which sensor data corresponding to signals outputted from respective sensors 1A provided in a plurality of manufacturing devices 1 is accumulated in the sensor data collection device 2, without being limited to the configuration in which sensor data corresponding to signals outputted from the sensor 1A provided in one manufacturing device 1 is accumulated in the sensor data collection device 2.

The anomaly detection device 3 is configured as a computer having, for example, at least one processor 3A and a storage medium 3B. The anomaly detection device 3 is also configured to read sensor data accumulated in the sensor data collection device 2 and to perform a process to determine the presence or absence of anomaly in the manufacturing device 1 from the read sensor data. The anomaly detection device 3 is also configured to generate, when a determination result that there is anomaly in the manufacturing device 1 is obtained, a signal showing details of anomaly corresponding to the determination result and to output the generated signal to at least either the display device 4 or the alarm device 5.

In other words, the manufacturing device 1 corresponds to a device as a subject of monitoring in the monitor system 101 and corresponds to a device as a subject of anomaly detection by the anomaly detection device 3.

The display device 4 is configured to have, for example, a liquid crystal monitor. The display device 4 is also configured to be capable of displaying, on a screen, a character string, etc. to notify anomaly occurring in the manufacturing device 1 according to a signal outputted from the anomaly detection device 3.

The alarm device 5 is configured to have, for example, a lamp or buzzer. The alarm device 5 is also configured to operate according to a signal outputted from the anomaly detection device 3 to enable notification of occurrence of anomaly in the manufacturing device 1.

Figure 2:
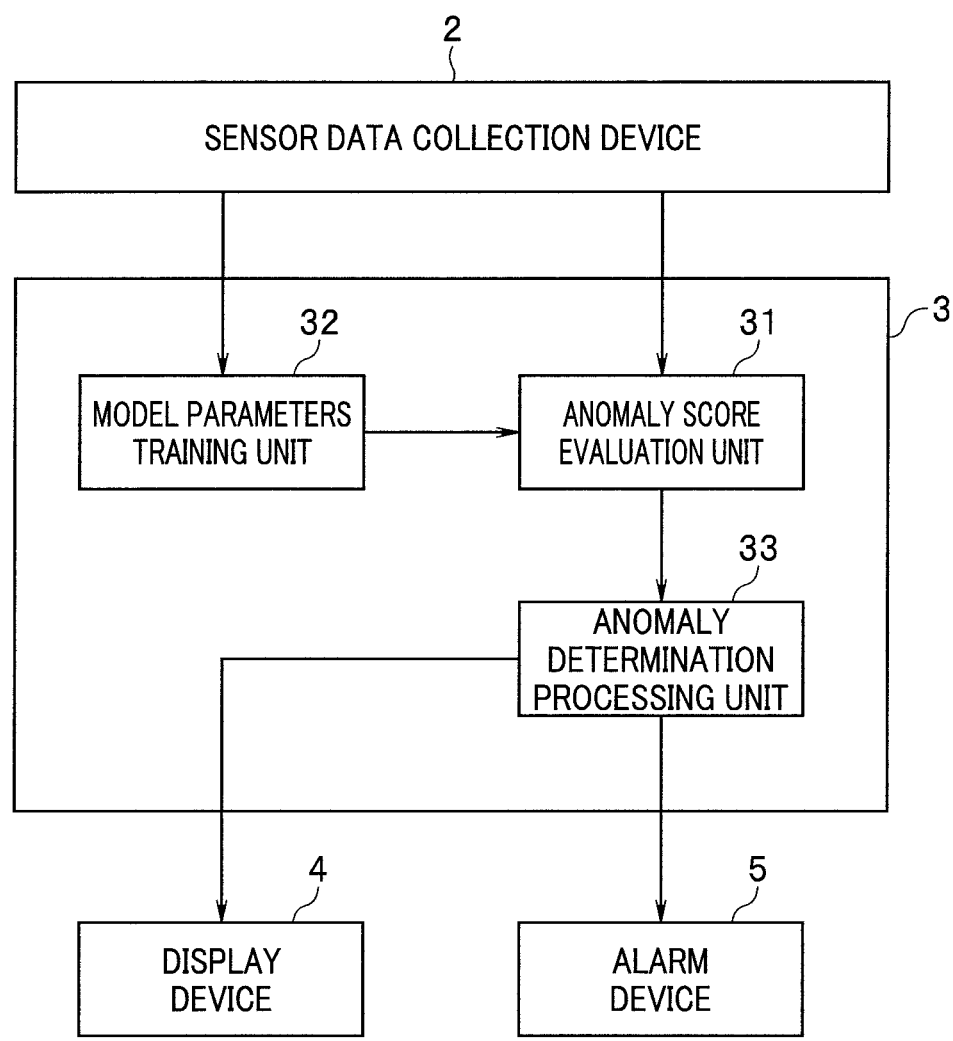
FIG. 2 shows an example of a configuration of the anomaly detection device according to the embodiment.

The anomaly detection device 3 is composed of, for example, an anomaly score evaluation unit 31, a model parameters training unit 32 and an anomaly determination processing unit 33 as shown in FIG. 2. FIG. 2 shows an example of a configuration of the anomaly detection device according to the embodiment.

The anomaly score evaluation unit 31 is configured to read sensor data accumulated in the sensor data collection device 2 and to perform a process to calculate an anomaly score corresponding to an evaluation value representing evaluation of a magnitude of anomaly in a sensor value (actual measurement value) as a subject of evaluation included in the read sensor data. The anomaly score evaluation unit 31 is also configured to output the anomaly score calculated in the above process to the anomaly determination processing unit 33.

The model parameters training unit 32 is configured to read sensor data accumulated in the sensor data collection device 2 and to perform a training process to obtain, based on a plurality of time series sensor values (actual measurement values) included in the read sensor data, model parameters used in the anomaly score evaluation unit 31.

The anomaly determination processing unit 33 is configured to perform a determination process to determine, based on the anomaly score outputted from the anomaly score evaluation unit 31, the presence or absence of anomaly in the manufacturing device 1. The anomaly determination processing unit 33 is also configured to generate, when a determination result that there is anomaly in the manufacturing device 1 is obtained, a signal showing details of anomaly corresponding to the determination result and to output the generated signal to at least either the display device 4 or the alarm device 5.

Figure 3:
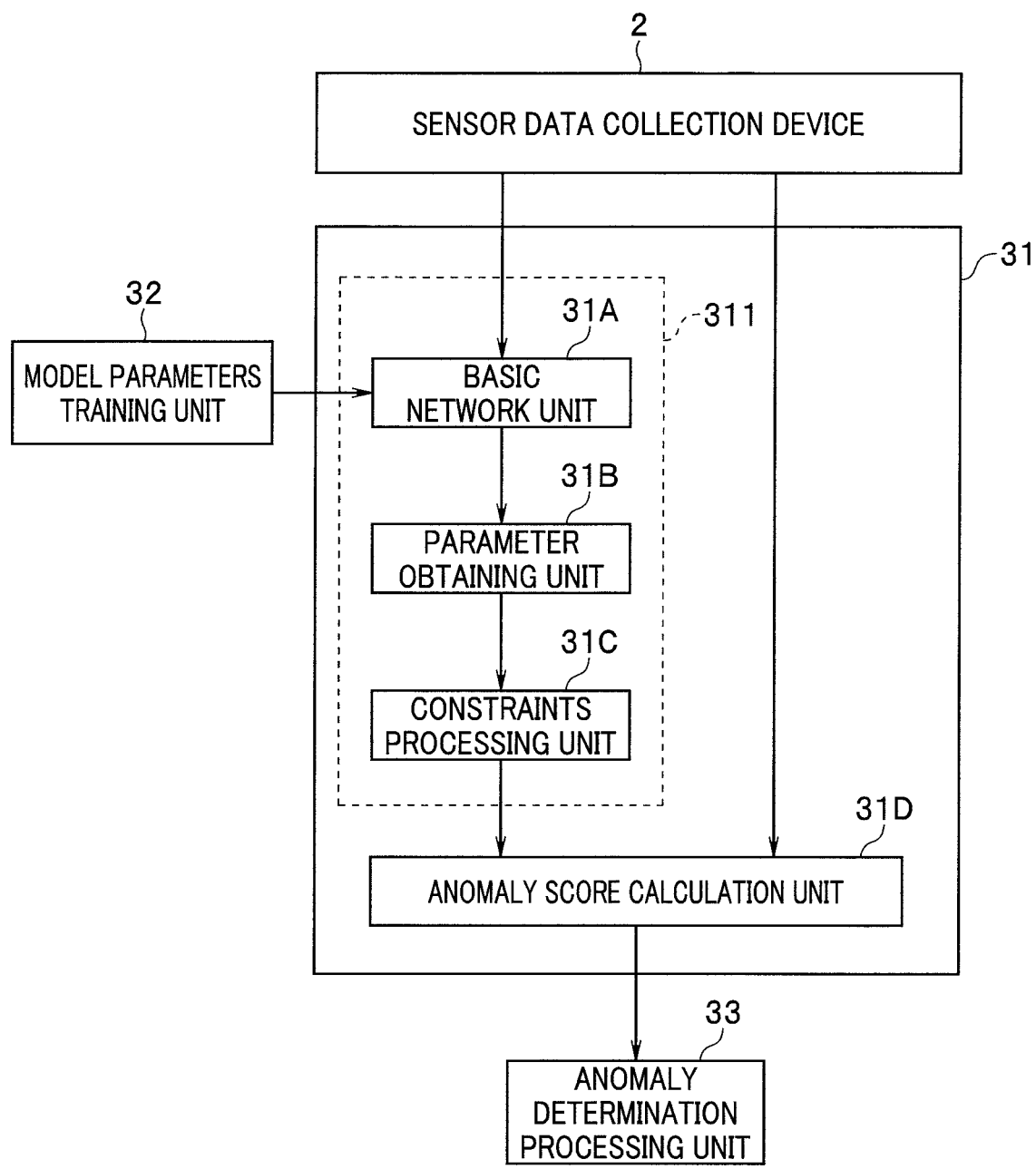
FIG. 3 shows an example of a configuration of an anomaly score evaluation unit included in the anomaly detection device according to the embodiment.

The anomaly score evaluation unit 31 is composed of, for example, a prediction unit 311 and an anomaly score calculation unit 31D as shown in FIG. 3. FIG. 3 shows an example of a configuration of the anomaly score evaluation unit included in the anomaly detection device according to the embodiment.

The prediction unit 311 is configured to read sensor data accumulated in the sensor data collection device 2 and model parameters obtained by the model parameters training unit 32 and to perform a process to obtain, based on the read model parameters and a plurality of time series sensor values (actual measurement values) included in the read sensor data, distribution parameters required to express a continuous probability distribution representing a distribution state of sensor values (predicted values) as subjects of prediction. The prediction unit 311 is also configured to output the distribution parameters obtained in the above process to the anomaly score calculation unit 31D. The prediction unit 311 is configured to have a basic network unit 31A, a parameter obtaining unit 31B and a constraints processing unit 31C.

The basic network unit 31A is configured by using a multilayered neural network including, for example, an input layer, a hidden layer and an output layer. The basic network unit 31A is also configured to read model parameters held in the model parameters training unit 32 and to set, according to the read model parameters, each weight (connection strength) of the neural network corresponding to a parameter of the neural network. The basic network unit 31A is also configured to read, in a state of setting each weight according to model parameters read from the model parameters training unit 32, sensor data accumulated in the sensor data collection device 2 and to perform a process using, as input data, a plurality of time series sensor values (actual measurement value) included in the read sensor data to obtain output data. The basic network unit 31A is also configured to output the output data obtained in the above process to the parameter obtaining unit 31B.

Note that the basic network unit 31A in the present embodiment may be configured by using any neural networks as long as the basic network unit 31A has the same network configuration as a basic network unit 32A to be described later. More specifically, the basic network unit 31A in the present embodiment may be configured by using any of various neural networks including, for example, a fully connected neural network, a convolutional neural network and a recursive neural network.

The parameter obtaining unit 31B is configured to obtain basic parameters serving as sources of distribution parameters by performing a process to divide output data outputted from the basic network unit 31A. The parameter obtaining unit 31B is also configured to output the basic parameters obtained in the above process to the constraints processing unit 31C.

The constraints processing unit 31C is configured to perform a process to confine basic parameters outputted from the parameter obtaining unit 31B in a domain of a continuous probability distribution representing a distribution state of sensor values (predicted values) as subjects of prediction in order to obtain distribution parameters required to express the continuous probability distribution. The constraints processing unit 31C is also configured to output the distribution parameters obtained in the above process to the anomaly score calculation unit 31D.

The anomaly score calculation unit 31D is configured to read sensor data accumulated in the sensor data collection device 2 and to perform a process using distribution parameters outputted from the prediction unit 311 to calculate an anomaly score corresponding to an evaluation value representing evaluation of a magnitude of anomaly in a sensor value (actual measurement value) as a subject of evaluation included in the read sensor data. The anomaly score calculation unit 31D is also configured to output the anomaly score calculated in the above process to the anomaly determination processing unit 33.

Figure 4:
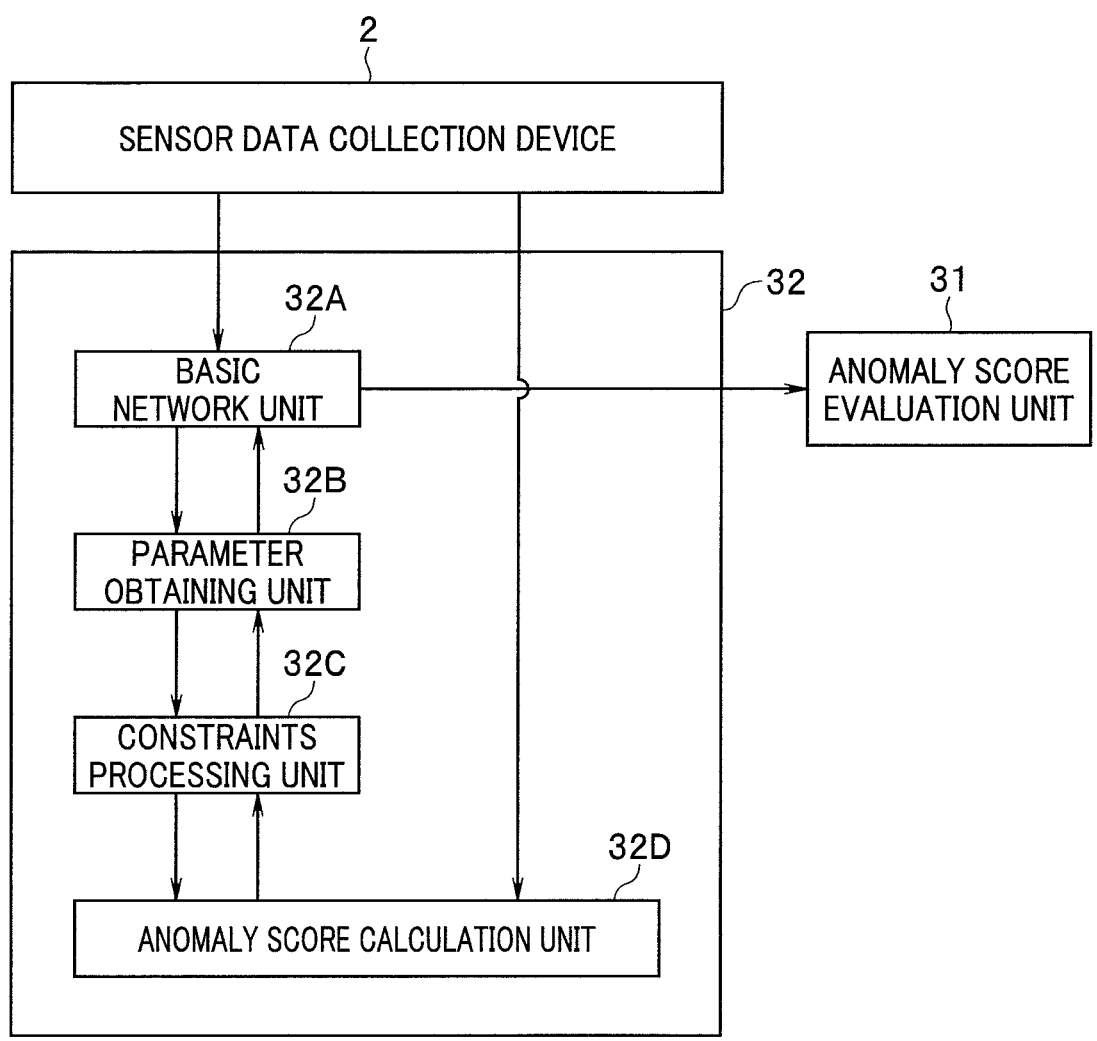
FIG. 4 shows an example of a configuration of a model parameters training unit included in the anomaly detection device according to the embodiment.

The model parameters training unit 32 is composed of, for example, a basic network unit 32A, a parameter obtaining unit 32B, a constraints processing unit 32C and an anomaly score calculation unit 32D as shown in FIG. 4. FIG. 4 shows an example of a configuration of the model parameters training unit included in the anomaly detection device according to the embodiment.

The basic network unit 32A is configured by using a multilayered neural network including, for example, an input layer, a hidden layer and an output layer. The basic network unit 32A is also configured by using a neural network having the same network configuration as the basic network unit 31A. The basic network unit 32A is configured to read sensor data accumulated in the sensor data collection device 2 and to obtain output data by performing a process using, as input data, a plurality of time series sensor values (actual measurement values) included in the read sensor data. The basic network unit 32A is also configured to output the output data obtained in the above process to the parameter obtaining unit 32B. The basic network unit 32A is also configured to apply, to the neural network, back propagation using a gradient (to be described later) outputted from the parameter obtaining unit 32B in order to perform a training process to update at least a part of weights (connection strength) included in the neural network. The basic network unit 32A is also configured to hold, as model parameters, each weight (connection strength) of the neural network when a predetermined termination condition set in the training process is satisfied.

Note that the basic network unit 32A in the present embodiment may also be configured by using any neural networks as long as the basic network unit 32A has the same network configuration as the basic network unit 31A. More specifically, the basic network unit 32A in the present embodiment may be configured by using any of various neural networks including, for example, the fully connected neural network, the convolutional neural network and the recursive neural network.

The parameter obtaining unit 32B is configured to obtain basic parameters serving as sources of distribution parameters by performing a process to divide output data outputted from the basic network unit 32A. The parameter obtaining unit 32B is also configured to output the basic parameters obtained in the above process to the constraints processing unit 32C. The parameter obtaining unit 32B is also configured to perform a process to calculate, based on a gradient (to be described later) outputted from the constraints processing unit 32C, a gradient of an anomaly score obtained from the anomaly score calculation unit 32D with respect to output data obtained from the basic network unit 32A. The parameter obtaining unit 32B is also configured to output the gradient calculated in the above process to the basic network unit 32A.

The constraints processing unit 32C is configured to perform a process to confine basic parameters outputted from the parameter obtaining unit 32B in a domain of a continuous probability distribution representing a distribution state of sensor values (predicted values) as subjects of prediction in order to obtain distribution parameters required to express the continuous probability distribution. The constraints processing unit 32C is also configured to output the distribution parameters obtained in the above process to the anomaly score calculation unit 32D. The constraints processing unit 32C is also configured to perform a process to calculate, based on a gradient (to be described later) outputted from the anomaly score calculation unit 32D, a gradient of an anomaly score obtained from the anomaly score calculation unit 32D with respect to basic parameters obtained from the parameter obtaining unit 32B. The constraints processing unit 32C is also configured to output the gradient calculated in the above process to the parameter obtaining unit 32B.

The anomaly score calculation unit 32D is configured to read sensor data accumulated in the sensor data collection device 2 and to perform a process using distribution parameters outputted from the constraints processing unit 32C to calculate an anomaly score corresponding to an evaluation value representing evaluation of a magnitude of anomaly in a sensor value (actual measurement value) as a subject of evaluation included in the read sensor data. The anomaly score calculation unit 32D is also configured to perform a process to calculate a gradient of an anomaly score with respect to distribution parameters obtained by the constraints processing unit 32C. The anomaly score calculation unit 32D is also configured to output the gradient calculated in the above process to the constraints processing unit 32C.

Figure 5:
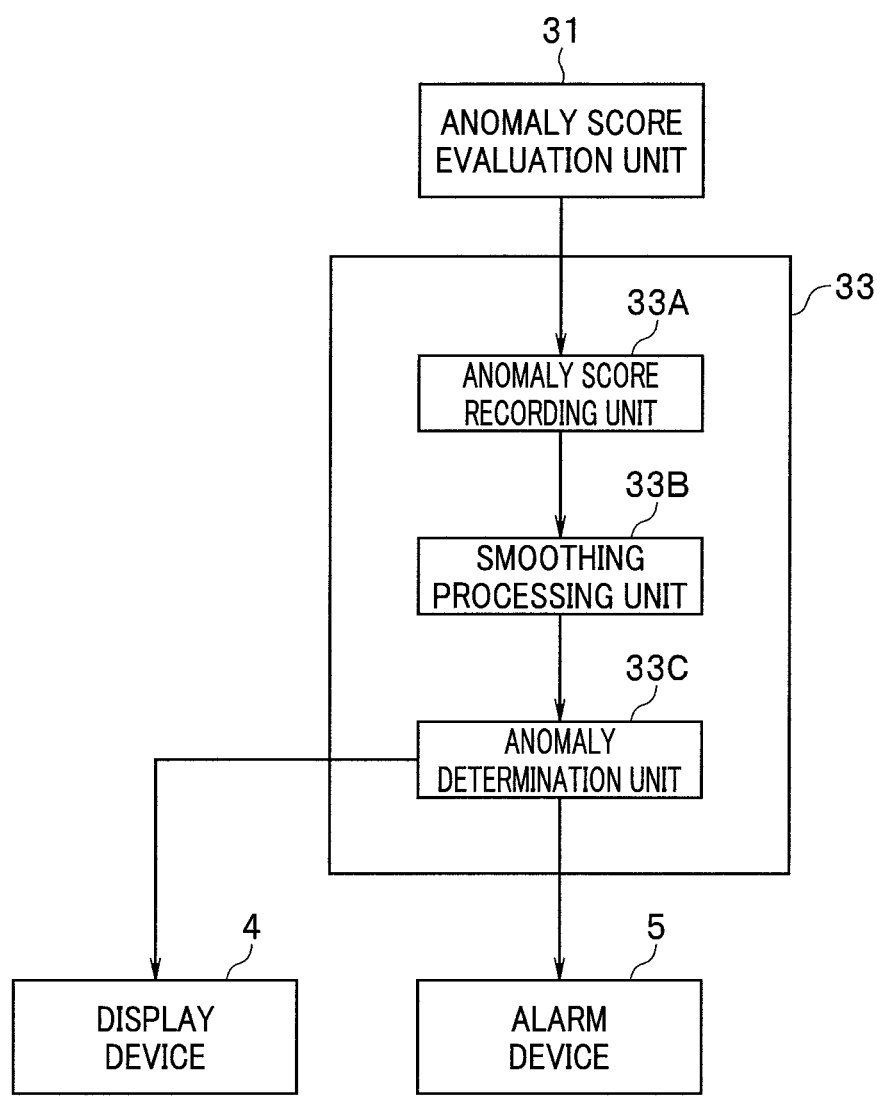
FIG. 5 shows an example of a configuration of an anomaly determination processing unit included in the anomaly detection device according to the embodiment.

The anomaly determination processing unit 33 is composed of, for example, an anomaly score recording unit 33A, a smoothing processing unit 33B and an anomaly determination unit 33C as shown in FIG. 5. FIG. 5 shows an example of a configuration of the anomaly determination processing unit included in the anomaly detection device according to the embodiment.

The anomaly score recording unit 33A is configured to time-sequentially record an anomaly score outputted from the anomaly score evaluation unit 31.

The smoothing processing unit 33B is configured to read a plurality of anomaly scores recorded time-sequentially in the anomaly score recording unit 33A and to apply a smoothing process to the read plurality of anomaly scores. The smoothing processing unit 33B is also configured to output anomaly scores obtained as a result of the above smoothing process to the anomaly determination unit 33C.

The anomaly determination unit 33C is configured to perform a determination process to determine the presence or absence of anomaly in the manufacturing device 1 based on anomaly scores outputted from the smoothing processing unit 33B. The anomaly determination unit 33C is also configured to generate, when a determination result that there is anomaly in the manufacturing device 1 is obtained, a signal showing details of abnormity corresponding to the determination result and to output the generated signal to at least either the display device 4 or the alarm device 5.

Note that in the present embodiment, functions of respective units of the anomaly score evaluation unit 31, the model parameters training unit 32 and the anomaly determination processing unit 33 may also be realized by hardware including the processor 3A and the storage medium 3B. Alternatively, in the present embodiment, for example, a program to realize functions of respective units of the anomaly score evaluation unit 31, the model parameters training unit 32 and the anomaly determination processing unit 33 may be stored in the storage medium 3B and the program may be read by the processor 3A to execute the functions. The storage medium 3B that is computer readable includes an optical disk such as a CD-ROM, a phase-change optical disk such as a DVD-ROM, a magneto-optical disk such as an MO (magneto-optical) and an MD (mini disk), a magnetic disk such as a floppy (registered trademark) disk and a removable hard disk, and a memory card such as compact flash (registered trademark), smart media, an SD memory card, or a memory stick. A hardware device including an integrated circuit (such as IC chip) configured according to a special design for the purpose of the present invention is also included in the storage medium.

Next, it is explained how the present embodiment functions.

Note that the following explanation is based on a case example of processing sensor data including a plurality of time series sensor values obtained from m sensors 1A or processing time series data of m dimensions. The following explanation is also based on the assumption that time series data is data having T (T≥2) sensor values expressed as X{$x_1$, $x_2$, ..., $x_T$} or data having a sequence length T. In the following explanation, time intervals of respective sensor values (actual measurement values) included in the time series data X are referred to as time steps. Additionally, in the following explanation, a number given to each of sensor values included in the time series data X at each time step is referred to as a step value. The following explanation is also based on a case example where m has a value of 2 or greater and a multivariate Gaussian distribution N (x; μ, Σ) expressed by an equation (1) below is used as a continuous probability distribution representing a distribution state of sensor values of m dimensions as subjects of prediction. Note that in the equation (1) below, x denotes a vector including sensor values of m dimensions, μ denotes a mean vector including a mean value of respective sensor values of the time series data X of m dimensions X, and Σ denotes an m-order variance-covariance matrix corresponding to a positive definite symmetric matrix including variance and covariance in the time series data X of m dimensions.

[Expression 1]

$$\mathcal{N}(x; \mu, \Sigma) = \frac{1}{(\sqrt{2\pi})^m \sqrt{|\Sigma|}} \exp\left(-\frac{1}{2}(x-\mu)^T \Sigma^{-1} (x-\mu)\right) \quad (1)$$

Figure 6:
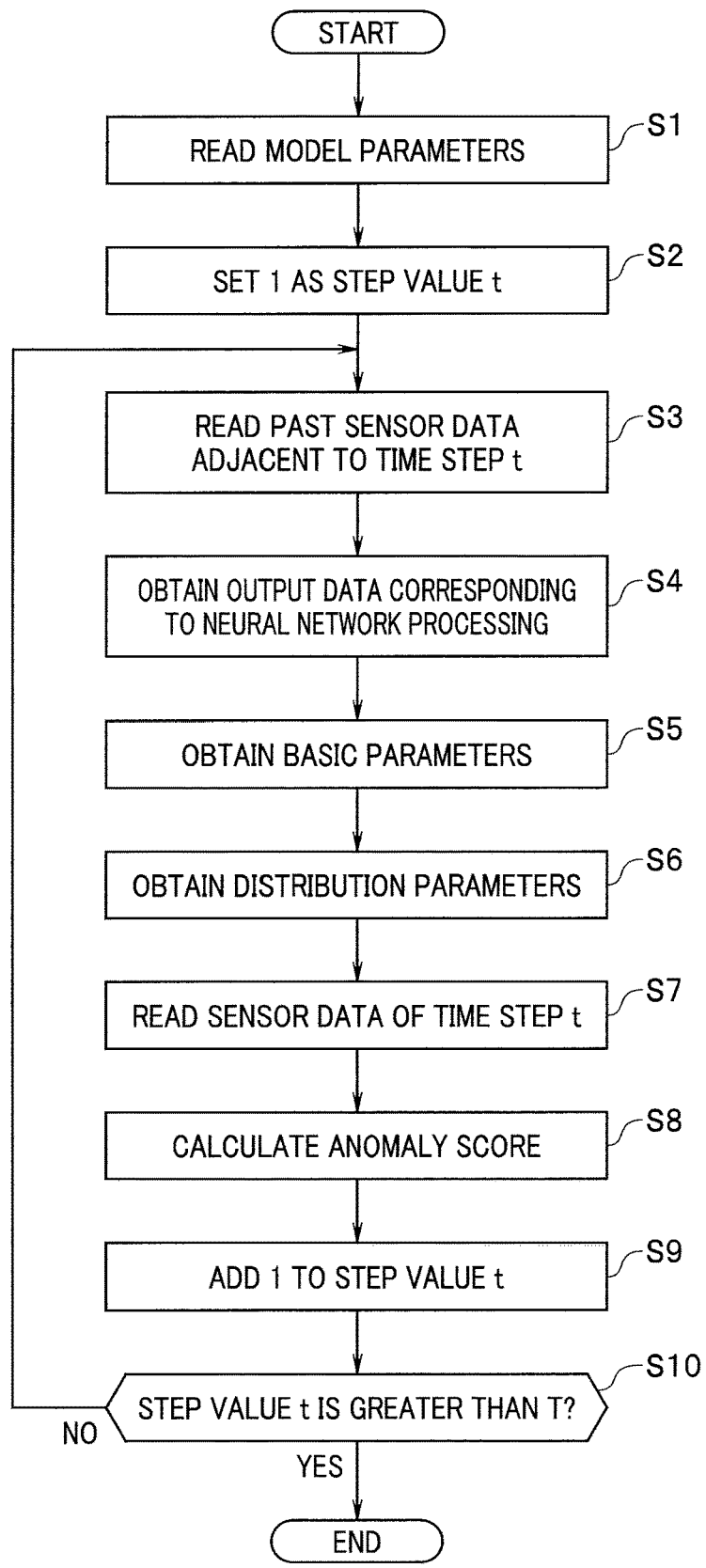
FIG. 6 is a flowchart showing a specific example of processes performed by the anomaly score evaluation unit included in the anomaly detection device according to the embodiment.

Firstly, processes performed by respective units of the anomaly score evaluation unit 31 are explained with reference to FIG. 6. FIG. 6 is a flowchart showing a specific example of processes performed by the anomaly score evaluation unit included in the anomaly detection device according to the embodiment.

The basic network unit 31A reads model parameters held in the model parameters training unit 32 and sets each weight (connection strength) included in the neural network according to the read model parameters (step S1 in FIG. 6).

Respective units (the basic network unit 31A, the parameter obtaining unit 31B and the constraints processing unit 31C) of the prediction unit 311 set 1 as a step value t of a sensor value as a subject of prediction (step S2 in FIG. 6). The anomaly score calculation unit 31D also sets 1 as the step value t of a sensor value as a subject of evaluation (step S2 in FIG. 6).

The basic network unit 31A reads past sensor data adjacent to the time step t from sensor data accumulated in the sensor data collection device 2 (step S3 in FIG. 6).

More specifically, in a case as an example where sensor values $x_t$ of m dimensions corresponding to the time step t are predicted, the basic network unit 31A reads past sensor data including W sensor values {$x_{t-w}$, $x_{t-w+1}$, ..., $x_{t-1}$} of m dimensions corresponding to W (W≥2) time steps adjacent to the time step t from sensor data accumulated in the sensor data collection device 2.

The basic network unit 31A obtains output data by performing a process using, as input data, each sensor value included in the sensor data read at the step S3 in FIG. 6, and outputs the obtained output data to the parameter obtaining unit 31B (step S4 in FIG. 6). In other words, the basic network unit 31A obtains output data by performing a process using, as input data, a plurality of past actual measurement values corresponding to a plurality of time steps adjacent to the time step t.

The parameter obtaining unit 31B obtains basic parameters by performing a process to divide output data outputted from the basic network unit 31A, and outputs the obtained basic parameters to the constraints processing unit 31C (step S5 in FIG. 6).

More specifically, the basic network unit 31A performs, at the step S4 in FIG. 6 for example, a process using as input data a vector including W sensor values of m dimensions in order to obtain a vector including m+m² elements of data as output data v corresponding to the process. Then, at the step S5 in FIG. 6, the parameter obtaining unit 31B performs a process to divide the vector included in the output data v outputted from the basic network unit 31A in order to obtain, as basic parameters, a mean vector $\mu_t$ of m dimensions corresponding to the time step t and an m-order intermediate matrix U corresponding to an m-order square matrix. In other words, a relationship as expressed by an equation (2) below is established between the output data v outputted from the basic network unit 31A and the mean vector $\mu_t$ as well as the intermediate matrix U included in the basic parameter obtained from the parameter obtaining unit 31B. Note that an operator vec(•) in the equation (2) below denotes a process to create a vector by extracting and connecting each one of columns of a matrix.

[Expression 2]

$$v = \begin{bmatrix} \mu_t \\ vec(U) \end{bmatrix} \quad (2)$$

The constraints processing unit 31C performs a process to confine a basic parameter outputted from the parameter obtaining unit 31B in a domain of a continuous probability distribution representing a distribution state of sensor values as subjects of prediction in order to obtain distribution parameters required to express the continuous probability distribution, and outputs the obtained distribution parameters to the anomaly score calculation unit 31D (step S6 in FIG. 6).

More specifically, as a process to confine the m-order intermediate matrix U outputted from the parameter obtaining unit 31B in a domain of the multivariate Gaussian distribution N shown in the above equation (1), the constraints processing unit 31C performs a process to apply, for example, an equation (3) below to the m-order intermediate matrix U outputted from the parameter obtaining unit 31B in order to obtain an m-order variance-covariance matrix $\Sigma_t$ corresponding to the time step t. Note that the equation (3) below is based on the assumption that I denotes an m-order identity matrix and λ denotes a positive real number.

[Expression 3]

$$\Sigma_t = U^T U + \lambda I \quad (3)$$

Note that the constraints processing unit 31C does not perform a process to the mean vector $\mu_t$ outputted from the parameter obtaining unit 31B. Therefore, the constraints processing unit 31C obtains, at the step S6 in FIG. 6, the variance-covariance matrix $\Sigma_t$ corresponding to a result of the process using the above equation (3) and the mean vector $\mu_t$ outputted from the parameter obtaining unit 31B as distribution parameters required to express the multivariate Gaussian distribution N ($x_t$; $\mu_t$, $\Sigma_t$) denoting a distribution state of the sensor values $x_t$ of m dimensions corresponding to the time step t, and outputs the obtained distribution parameters to the anomaly score calculation unit 31D.

Herein, because the intermediate matrix U includes data that is the same as the output data v of the neural network in the basic network unit 31A, the intermediate matrix U may be obtained as a matrix that is not confined in a domain of the variance-covariance matrix $\Sigma$ of the multivariate Gaussian distribution N shown in the above equation (1). In contrast, in the present embodiment, the constraints processing unit 31C performs a process as shown in the above equation (3) to add a Gram matrix $U^T U$ of the m-order intermediate matrix U and a matrix obtained by multiplying the m-order identity matrix I by $\lambda$ in order to obtain the m-order variance-covariance matrix $\Sigma_t$ corresponding to a positive definite symmetric matrix confined in a domain of the multivariate Gaussian distribution N as shown in the above equation (1).

The anomaly score calculation unit 31D reads sensor data including sensor values $x_t$ of m dimensions corresponding to the time step t from sensor data accumulated in the sensor data collection device 2 (step S7 in FIG. 6).

The anomaly score calculation unit 31D performs a process using distribution parameters outputted from the constraints processing unit 31C of the prediction unit 311 to calculate an anomaly score corresponding to each sensor value included in the sensor data read at the step S7 in FIG. 6, and outputs the calculated anomaly score to the anomaly determination processing unit 33 (step S8 in FIG. 6).

More specifically, the anomaly score calculation unit 31D applies, to an equation (4) below, for example, the variance-covariance matrix $\Sigma_t$ as well as the mean vector $\mu_t$ included in distribution parameters outputted from the constraints processing unit 31C and the sensor values $x_t$ of m dimensions included in the sensor data read at step S7 in FIG. 6 in order to calculate an anomaly score f corresponding to each of the sensor values $x_t$ of m dimensions.

[Expression 4]

$$f = -\log\left(N\left(x_t; \mu_t, \sum_t\right)\right) \quad (4)$$
$$= \frac{m}{2}\log(2\pi) + \frac{1}{2}\log\left|\sum_t\right| + \frac{1}{2}(x_t - \mu_t)^T \sum_t^{-1} (x_t - \mu_t)$$

Herein, according to the above equation (4), the anomaly score calculation unit 31D performs a process to calculate a negative logarithmic likelihood of the multivariate Gaussian distribution N ($x_t$; $\mu_t$, $\Sigma_t$) as a process to calculate the anomaly score f. Therefore, in a case as an example where the sensor values $x_t$ of m dimensions corresponding to the time step t are well fitted to the multivariate Gaussian distribution N ($x_t$; $\mu_t$, $\Sigma_t$), the anomaly score f is calculated as a relatively small value. In contrast, in a case where the sensor values $x_t$ of m dimensions corresponding to the time step t are not well fitted to the multivariate Gaussian distribution N ($x_t$; $\mu_t$, $\Sigma_t$), the anomaly score f is calculated as a relatively large value.

Note that the anomaly score calculation unit 31D in the present embodiment may calculate the anomaly score f based on an evaluation index different from the negative logarithmic likelihood shown in the above equation (4) as long as a process using distribution parameters outputted from the constraints processing unit 31C is performed.

After completion of the process at the step S6 in FIG. 6, respective units of the prediction unit 311 add 1 to the step value t of sensor values as subjects of prediction (step S9 in FIG. 6). After completion of the process at the step 8 in FIG. 6, the anomaly score calculation unit 31D also adds 1 to the step value t of sensor values as subjects of evaluation (step S9 in FIG. 6).

Respective units of the prediction unit 311 and the anomaly score calculation unit 31D determine whether the step value t is greater than the sequence length T of the time series data X (step S10 in FIG. 6).

When a determination result that the step value t is equal to or less than the sequence length T is obtained (S10: NO), respective units of the prediction unit 311 and the anomaly score calculation unit 31D perform the processes again from the step S3 in FIG. 6. In contrast, when a determination result that step value t is greater than the sequence length T is obtained (S10: YES), respective units of the prediction unit 311 and the anomaly score calculation unit 31D complete a series of the processes in FIG. 6.

Note that a series of the processes in FIG. 6 is not limited to the case where m is 2 or greater, but also applied to a case where m is 1 in substantially the same manner. In other words, a series of the processes in FIG. 6 is applied when m≥1.

As stated above, the prediction unit 311 performs a process to obtain, at each time step of the time series data X of m dimensions, distribution parameters required to express a continuous probability distribution representing a distribution state of predicted values that can be obtained at the time step t (1≤t≤T) of the time series data of m dimensions. Additionally, as stated above, the anomaly score calculation unit 31D performs a process using distribution parameters obtained from the prediction unit 311 to calculate an anomaly score corresponding to an evaluation value representing evaluation of a magnitude of anomaly in an actual measurement value at the time step t of the time series data of m dimensions.

According to the present embodiment, when prior knowledge of sensor data is obtained beforehand, any additional processes corresponding to the prior knowledge may also be performed by the constraints processing unit 31C. More specifically, according to the present embodiment, in a case as an example where a plurality of sensors 1A are provided at positions separated from each other, a process to set 0 as covariance of the plurality of sensors 1A included in variance-covariance matrix $\Sigma_t$ may be further performed by the constraints processing unit 31C. Additionally, according to the present embodiment, in a case as an example where a sensor value obtained from the sensor 1A is obviously 0 or higher, a process relevant to non-negativity constraints applied to the mean vector $\mu_t$ may be further performed by the constraints processing unit 31C.

According to the present embodiment, by appropriately modifying a series of the processes in FIG. 6, in a case as an example where m has a value of 2 or greater, at least one-dimensional time series data included in time series data of m dimensions may be processed by the prediction unit 311 to obtain distribution parameters required to express a continuous probability distribution representing a distribution state of the sensor values $x_t$ (predicted values) corresponding to the time step t, and a process may be performed by the anomaly score calculation unit 31D to calculate the anomaly score f using the distribution parameters.

Figure 7:
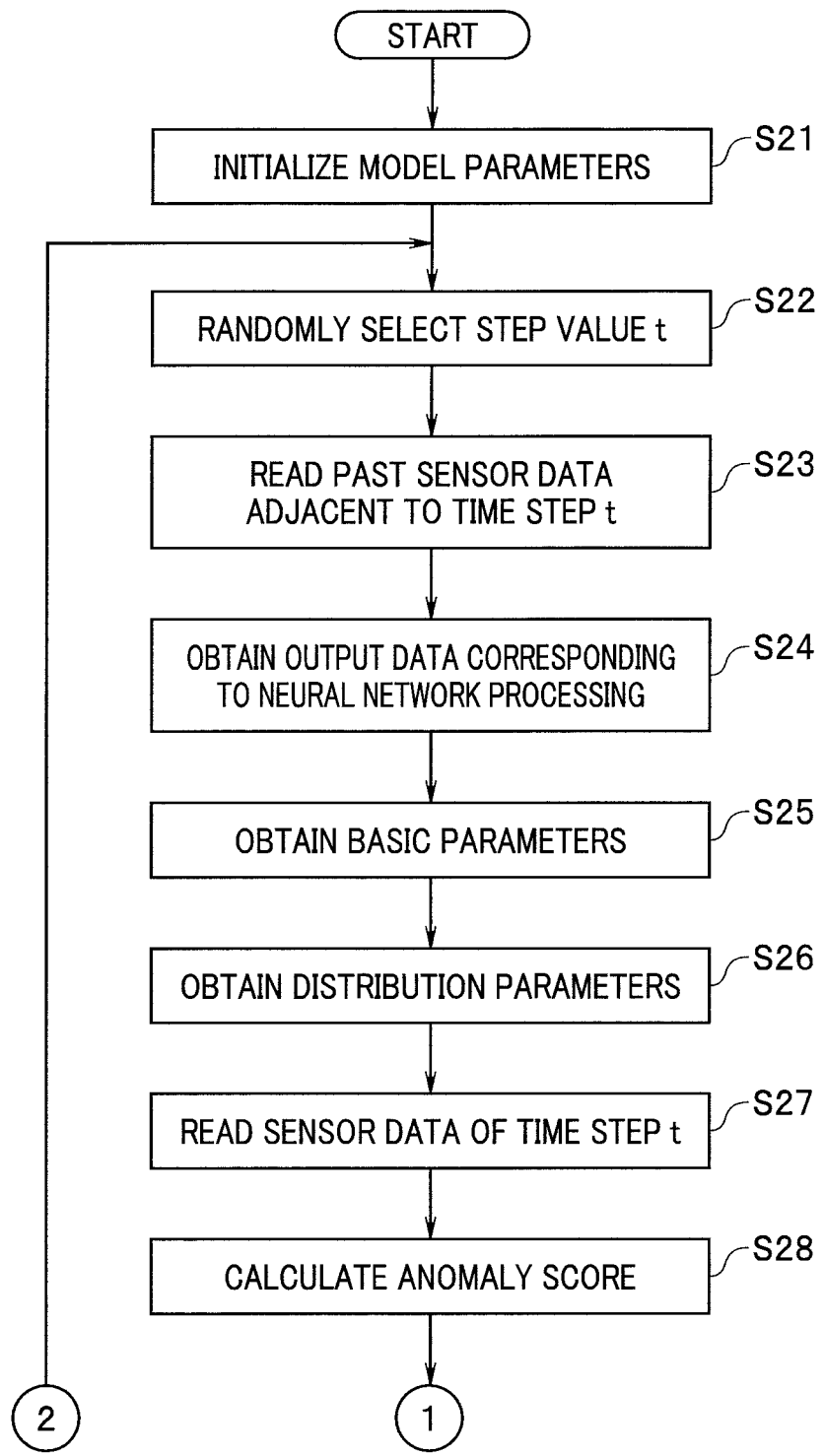
FIG. 7 is a flowchart partially showing a specific example of processes performed by the model parameters training unit included in the anomaly detection device according to the embodiment.
Figure 8:
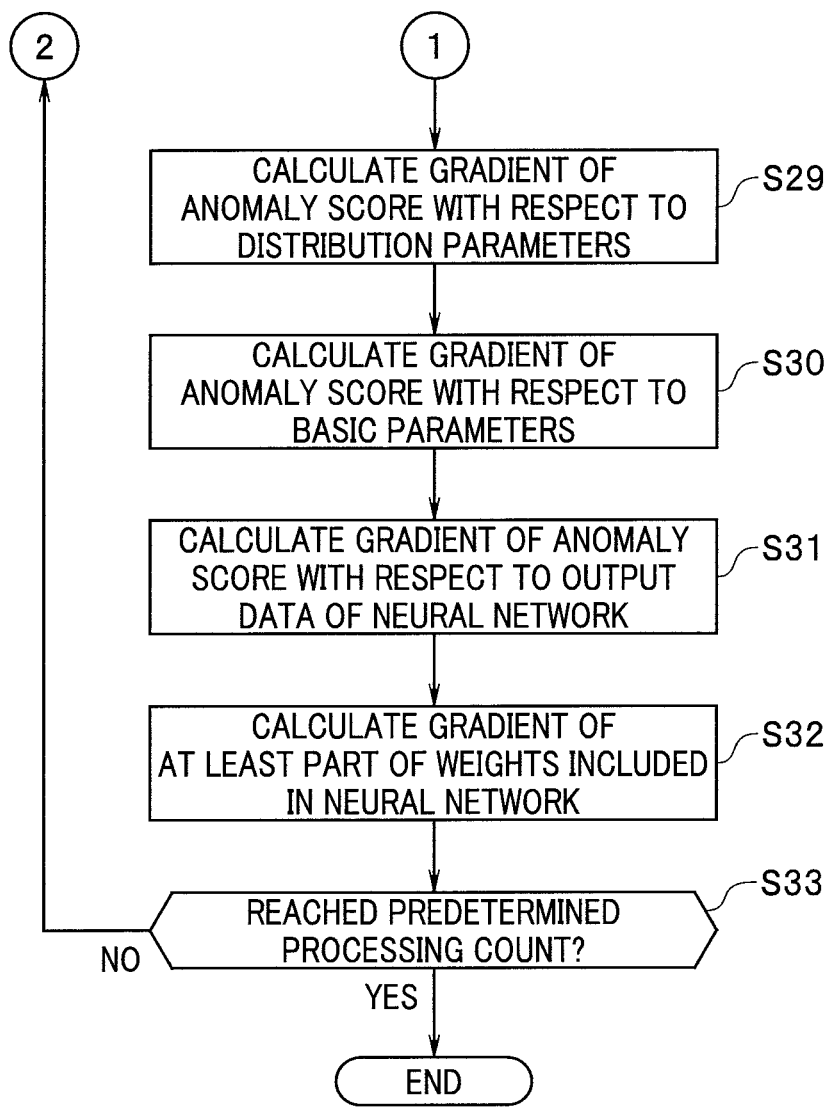
FIG. 8 is a flowchart showing processes continued from FIG. 7.

Next, processes performed by respective units of the model parameters training unit 32 are explained with reference to FIG. 7 and FIG. 8. FIG. 7 is a flowchart partially showing a specific example of processes performed by the model parameters training unit included in the anomaly detection device according to the embodiment. FIG. 8 is a flowchart showing processes continued from FIG. 7.

Note that the following explanation is based on a case example where processes are performed using the time series data $X=\{x_1, x_2, \ldots, x_T\}$ including T sensor values obtained when the sensor 1A is in a normal state or when the manufacturing device 1 operates normally.

The basic network unit 32A uses a random number to initialize each weight (connection strength) of the neural network corresponding to currently stored model parameters (step S21 in FIG. 7).

More specifically, the basic network unit 32A uses, for example, a random number generated according to a normal distribution or a uniform distribution to initialize each weight (connection strength) of the neural network corresponding to currently stored model parameters.

The basic network unit 32A sets the step value t of a sensor value as a subject of prediction by a step value randomly selected from T step values (step S22 in FIG. 7). The parameter obtaining unit 32B and the constraints processing unit 32C also set the step value t of a sensor value as a subject of prediction by the same step value selected by the basic network unit 32A (step S22 in FIG. 7). The anomaly score calculation unit 32D also sets the step value t of the sensor value as a subject of evaluation by the same step value selected by the basic network unit 32A (step S22 in FIG. 7).

The basic network unit 32A reads past sensor data adjacent to the time step t having the step value t set at the step S22 in FIG. 7 from sensor data accumulated in the sensor data collection device 2 (step S23 in FIG. 7).

More specifically, the basic network unit 32A performs, for example, substantially the same process as the process performed by the basic network unit 31A at the step S3 in FIG. 6 to read past sensor data including W sensor values of m dimensions $\{x_{t-W}, x_{t-W+1}, \ldots, x_{t-1}\}$ corresponding to W time steps adjacent to the time step t.

The basic network unit 32A obtains output data by performing a process using as input data each sensor value included in the sensor data read at the step S23 in FIG. 7, and outputs the obtained output data to the parameter obtaining unit 32B (step S24 in FIG. 7).

More specifically, the basic network unit 32A performs, for example, substantially the same process as the process performed by the basic network unit 31A at the step S4 in FIG. 6 to obtain a vector including $m+m^2$ elements of data as the output data v, and outputs the obtained output data v to the parameter obtaining unit 32B.

The parameter obtaining unit 32B obtains a basic parameter by performing a process to divide the output data outputted from the basic network unit 32A, and outputs the obtained basic parameters to the constraints processing unit 32C (step S25 in FIG. 7).

More specifically, the parameter obtaining unit 32B performs, for example, substantially the same process as the process performed by the parameter obtaining unit 31B at the step S5 in FIG. 6 to obtain, as basic parameters, the mean vector $\mu_t$ of m dimensions corresponding to the time step t and the intermediate matrix U corresponding to the m-order square matrix, and outputs the obtained basic parameters to the constraints processing unit 32C.

The constraints processing unit 32C performs a process to confine the basic parameters outputted from the parameter obtaining unit 32B in a domain of a continuous probability distribution representing a distribution state of sensor values as subjects of prediction in order to obtain distribution parameters required to express the continuous probability distribution, and outputs the obtained distribution parameters to the anomaly score calculation unit 32D (step S26 in FIG. 7).

More specifically, the constraints processing unit 32C performs, for example, substantially the same process as the process performed by the constraints processing unit 31C at the step S6 in FIG. 6 (process using the above equation (4)) in order to obtain the variance-covariance matrix $\Sigma_t$ and the mean vector $\mu_t$ as distribution parameters required to express the multivariate Gaussian distribution $N(x_t; \mu_t, \Sigma_t)$ denoting a distribution state of the sensor values $x_t$ of m dimensions corresponding to the time step t, and outputs the obtained distribution parameters to the anomaly score calculation unit 32D.

The anomaly score calculation unit 32D reads, from sensor data accumulated in the sensor data collection device 2, sensor data including the sensor values $x_t$ of m dimensions corresponding to the time step t having the step value t set at the step S22 in FIG. 7 (step S27 in FIG. 7).

The anomaly score calculation unit 32D performs a process using distribution parameters outputted from the constraints processing unit 32C in order to calculate an anomaly score corresponding to each sensor value included in the sensor data read at the step S27 in FIG. 7 (step S28 in FIG. 7).

More specifically, the anomaly score calculation unit 32D performs, for example, substantially the same process as the process performed by the anomaly score calculation unit 31D at the step S8 in FIG. 6 (process using the above equation (2)) in order to calculate the anomaly score f corresponding to each of the sensor values $x_t$ of m dimensions.

The anomaly score calculation unit 32D calculates a gradient of the anomaly score with respect to distribution parameters used for calculation of the anomaly score at the step S28 in FIG. 7, and outputs the calculated gradient to the constraints processing unit 32C (step S29 in FIG. 8).

More specifically, the anomaly score calculation unit 32D applies, to an equation (5) below, for example, the variance-covariance matrix Et and the mean vector $\mu_t$ used for calculation of the anomaly score at the step S28 in FIG. 7, and the sensor values $x_t$ of m dimensions read at the step S27 in FIG. 7 in order to calculate a gradient $\partial f/\partial \mu_t$ of the anomaly score f with respect to the mean vector $\mu_t$. The anomaly score calculation unit 32D also applies, to an equation (6) below, for example, the variance-covariance matrix $\Sigma_t$ and the mean vector $\mu_t$ used for calculation of the anomaly score at the step S28 in FIG. 7, and the sensor values $x_t$ of m dimensions read at the step S27 in FIG. 7 in order to calculate a gradient $\partial f/\partial \Sigma_t$ of the anomaly score f for the variance-covariance matrix $\Sigma_t$. Then, the anomaly score calculation unit 32D outputs the gradients $\partial f/\partial \mu_t$ and $\partial f/\partial \Sigma_t$ as calculated above to the constraints processing unit 32C.

[Expression 5]

$$\frac{\partial f}{\partial \mu_t} = -\sum_t \Sigma_t^{-1}(x_t - \mu_t) \quad (5)$$

[Expression 6]

$$\frac{\partial f}{\partial \Sigma_t} = \frac{1}{2}\sum_t \Sigma_t^{-1} - \frac{1}{2}\sum_t \Sigma_t^{-1}(x_t - \mu_t)(x_t - \mu_t)^T \Sigma_t^{-1} \quad (6)$$

The constraints processing unit 32C calculates, based on the gradient outputted from the anomaly score calculation unit 32D, a gradient of the anomaly score calculated at the step S28 in FIG. 7 with respect to basic parameters used for obtaining distribution parameters at the step S26 in FIG. 7, and outputs the calculated gradient to the parameter obtaining unit 32B (step S30 in FIG. 8).

More specifically, the constraints processing unit 32C applies, to an equation (7) below, for example, the intermediate matrix U used for obtaining distribution parameters at the step S26 in FIG. 7 and the gradient ∂f/∂Σ$_t$ outputted from the anomaly score calculation unit 32D at the step S29 in FIG. 8 in order to calculate a gradient ∂f/∂U$_{ij}$ of the anomaly score f with respect to a component U$_{ij}$ of an i-th row and a j-th column of the intermediate matrix U. Note that the equation (7) below is based on the assumption that an operator Tr[–] denotes a matrix trace and a matrix J$^{ij}$ denotes a matrix where a component of an i-th row and a j-th column corresponds to 1 and other components correspond to 0.

[Expression 7]

$$\frac{\partial f}{\partial U_{ij}} = Tr\left[\left(\frac{\partial f}{\partial \Sigma_t}\right)^T \frac{\partial \Sigma_t}{\partial U_{ij}}\right] \quad (7)$$

$$= Tr\left[\left(\frac{\partial f}{\partial \Sigma_t}\right)^T (U^T J^{ij} + J^{ji} U)\right]$$

Note that the constraints processing unit 32C does not perform a process to the gradient ∂f/∂μ$_t$ outputted from the anomaly score calculation unit 32D. Therefore, the constraints processing unit 32C obtains, as a gradient ∂f/∂U, a result of the calculation of the gradient ∂f/∂U$_{ij}$ corresponding to each component included in the intermediate matrix U, and outputs the obtained gradient ∂f/∂U along with the gradient ∂f/∂μ$_t$ to the parameter obtaining unit 32B.

The parameter obtaining unit 32B calculates, based on the gradient outputted from the constraints processing unit 32C, a gradient of the anomaly score calculated at the step S28 in FIG. 7 with respect to the output data used for obtaining basic parameters at the step S25 in FIG. 7, and outputs the calculated gradient to the basic network unit 32A (step S31 in FIG. 8).

More specifically, the parameter obtaining unit 32B applies, to an equation (8) below, for example, the gradients ∂f/∂U and ∂f/∂μ outputted from the constraints processing unit 32C at the step S30 in FIG. 8 in order to calculate a gradient ∂f/∂v of the anomaly score f with respect to the output data v. Then, the parameter obtaining unit 32B outputs the gradient ∂f/∂v as calculated above to the basic network unit 32A.

[Expression 8]

$$\frac{\partial f}{\partial v} = \begin{bmatrix} \frac{\partial f}{\partial \mu_t} \\ vec\left(\frac{\partial f}{\partial U}\right) \end{bmatrix} \quad (8)$$

The basic network unit 32A applies, to the neural network, back propagation based on the gradient ∂f/∂v outputted from the parameter obtaining unit 32B in order to calculate a gradient of at least a part of weights (connection strength) included in the neural network (step S32 in FIG. 8).

According to the present embodiment, in the process to update weights (connection strength) included in the neural network by the basic network unit 32A using a gradient calculated at the step S32 in FIG. 8, an algorithm including, for example, Adagrad, RMSprop, AdaDelta and Adam may be used. According to the present embodiment, at least a part of weights (connection strength) included in the neural network may be updated through a process performed by the basic network unit 32A using a gradient calculated at the step S32 in FIG. 8.

The basic network unit 32A determines whether a processing count (neural network parameter update count) at the step S32 in FIG. 8 has reached a predetermined processing count (step S33 in FIG. 8).

When a determination result that a processing count at the step S32 in FIG. 8 has not reached a predetermined processing count is obtained (S33: NO), the basic network unit 32A returns the process to the step S22 in FIG. 7. In contrast, when a determination result that a processing count obtained at the step S32 in FIG. 8 has reached a predetermined processing count is obtained (S33: YES), the basic network unit 32A finishes a series of the processes in a state where each weight (connection strength) of the neural network at the time of obtaining the determination result is held as model parameters.

According to the present embodiment, the process at the step S33 in FIG. 8 is not limited to the determination process to determine whether a processing count at the step S32 in FIG. 8 has reached a predetermined processing count, but a determination process may also be performed as to, for example, whether the anomaly score calculated at the step S28 in FIG. 7 is converged to a constant or not. Then, according to such a determination process, a series of the processes after the step S22 in FIG. 7 is repeated until a determination result that the anomaly score calculated at the step S28 in FIG. 7 has been converted to a constant value is obtained.

According to the present embodiment, by appropriately modifying a series of the processes shown in FIG. 7 and FIG. 8, a process corresponding to mini batch training may also be performed. More specifically, according to the present embodiment, a process may be performed by, for example, randomly selecting a plurality of the step values t from the T step values in the time series data X, calculating a plurality of the anomaly scores f in a plurality of the sensor values x$_t$ corresponding to the plurality of step values t, calculating a plurality of the gradients ∂f/∂v corresponding to the plurality of anomaly scores f, and updating each weight (connection strength) included in the neural network of the basic network unit 32A with the use of the plurality of gradients ∂f/∂v.

According to the present embodiment, by appropriately modifying a series of the processes shown in FIG. 7 and FIG. 8, a process may be performed by, for example, randomly selecting each one of the step values t from each of a plurality of the time series data X, calculating a plurality of the anomaly scores fin a plurality of the sensor values $x_t$ corresponding to each of the selected step values t, calculating a plurality of the gradients ∂f/∂v corresponding to the plurality of anomaly scores f, and updating each weight (connection strength) included in the neural network of the basic network unit 32A with the use of the plurality of gradients ∂f/∂v.

As stated above, the model parameters training unit 32 uses normal data corresponding to time series data including a plurality of actual measurement value obtained as a result of measurement of a physical quantity as a measurement object when the manufacturing device 1 (device as a subject of anomaly detection by the anomaly detection device 3) operates normally, and performs a training process corresponding to a process to repeatedly update parameters of the neural network of the basic network unit 32A having the same network configuration as the basic network unit 31A, in order to obtain model parameters used for setting parameters of the neural network of the basic network unit 31A. Additionally, as stated above, the model parameters training unit 32 performs a training process to calculate a gradient used for updating at least a part of weights (connection strength) included in the neural network of the basic network unit 32A with the use of the above normal data, and holds, as model parameters, each weight (connection strength) of the neural network obtained when a predetermined termination condition set in the training process is satisfied.

Lastly, processes performed by respective units of the anomaly determination processing unit 33 are explained.

The anomaly score recording unit 33A time-sequentially records an anomaly score outputted from the anomaly score evaluation unit 31.

More specifically, the anomaly score recording unit 33A time-sequentially records, for example, the anomaly score f calculated at each time step in the time series data X of m dimensions.

The smoothing processing unit 33B reads a plurality of anomaly scores recorded time-sequentially in the anomaly score recording unit 33A to apply a smoothing process to the read plurality of anomaly scores, and outputs an anomaly score obtained as a result of the smoothing process to the anomaly determination unit 33C.

More specifically, the smoothing processing unit 33B reads, from respective anomaly scores recorded in the anomaly score recording unit 33A, for example, a plurality of the anomaly scores f corresponding to a predetermined time step width or a predetermined time width in the time series data X in order to calculate a mean anomaly score corresponding to a mean value of the read plurality of anomaly scores f, and outputs the calculated mean anomaly score to the anomaly determination unit 33C. Namely, the smoothing processing unit 33B performs a smoothing process to calculate a mean value of a plurality of the anomaly scores f corresponding to a predetermined time step width or a predetermined time width in the time series data X.

Alternatively, the smoothing processing unit 33B reads, from respective anomaly scores recorded in the anomaly score recording unit 33A, for example, a plurality of the anomaly scores f corresponding to the time series data X of a predetermined number of products or a predetermined number of lots, calculates a mean anomaly score corresponding to a mean value of the read plurality of anomaly scores f, and outputs the calculated mean anomaly score to the anomaly determination unit 33C. Namely, the smoothing processing unit 33B performs a smoothing process to calculate a mean value of a plurality of the anomaly scores f corresponding to the time series data X of a predetermined number of products or a predetermined number of lots.

In the present embodiment, the smoothing processing unit 33B may also perform a process to calculate a moving average of anomaly scores f as a mean anomaly score. More specifically, the smoothing processing unit 33B may perform, for example, a smoothing process to calculate a mean value by sliding and reading a plurality of anomaly scores f corresponding to a predetermined time step width in the time series data X at each time step.

The anomaly determination unit 33C performs a determination process to determine the presence or absence of anomaly in the manufacturing device 1 based on the anomaly score outputted from the smoothing processing unit 33B. When a determination result that there is anomaly in the manufacturing device 1 is obtained, the anomaly determination unit 33C also generates a signal showing details of the anomaly corresponding to the determination result and outputs the generated signal to at least either the display device 4 or the alarm device 5.

More specifically, the anomaly determination unit 33C determines the presence or absence of anomaly in the manufacturing device 1 based on, for example, a plurality of mean anomaly scores corresponding to the time series data X outputted from the smoothing processing unit 33B. Then, in a case as an example where it is detected that a plurality of mean anomaly scores corresponding to the time series data X outputted from the smoothing processing unit 33B includes a predetermined number or more of mean anomaly scores in excess of a threshold value, the anomaly determination unit 33C obtains a determination result that there is anomaly in the manufacturing device 1, generates a signal showing details of the anomaly corresponding to the determination result, and outputs the generated signal to at least either the display device 4 or the alarm device 5. In contrast, in a case as an example where it is detected that a plurality of mean anomaly score corresponding to the time series data X outputted from the smoothing processing unit 33B include less than a predetermined number of mean anomaly scores in excess of a threshold value, the anomaly determination unit 33C obtains a determination result that there is no anomaly in the manufacturing device 1.

In the present embodiment, the threshold value used in the process performed by the anomaly determination unit 33C may be a preset fixed value or a variable value that can be changed by the operator, etc. In the present embodiment, the threshold value used in the process performed by the anomaly determination unit 33C may also be set as a value corresponding to a statistic calculated based on a mean anomaly score at the time of obtaining a determination result that there is no anomaly in the manufacturing device 1.

As stated above, the anomaly detection device 3 detects the presence or absence of anomaly from the time series data of m (m≥1) dimensions including T (T≥2) actual measurement values obtained by actually measuring a physical quantity as a measurement object.

Figure 9:
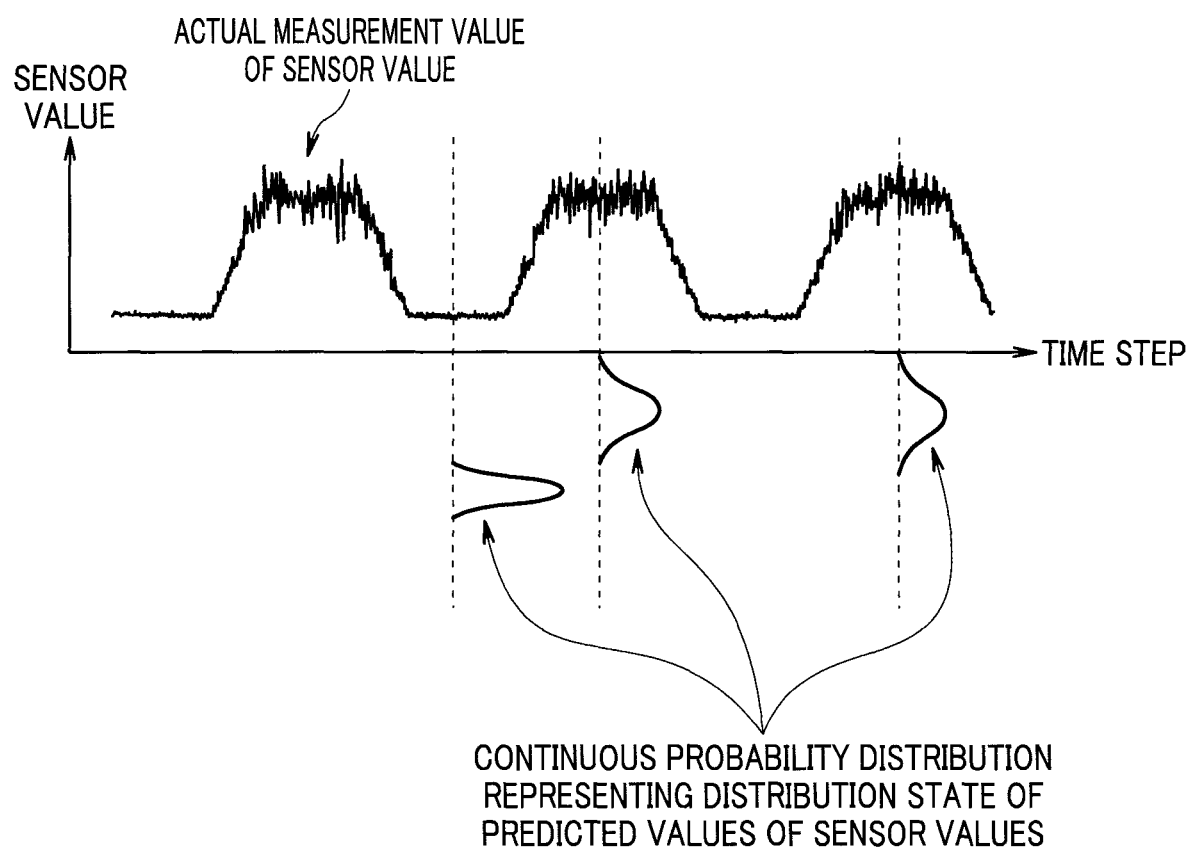
FIG. 9 is a schematic diagram to explain an effect of the embodiment.

As stated above, according to the present embodiment, a process is performed to obtain distribution parameters (the variance-covariance matrix $\Sigma_t$ and the mean vector $\mu_t$) required to express a continuous probability distribution (the multivariate Gaussian distribution N ($x_t$; $\mu_t$, $\Sigma_t$)) denoting a distribution state of the sensor values $x_t$ of m dimensions corresponding to the time step t, and to make the obtained distribution parameters vary at each time step. Therefore, according to the present embodiment, for example, a continuous probability distribution representing a distribution state of predicted values of a sensor value as schematically shown in FIG. 9 can be used to create, as a autoregressive model used for anomaly detection in the manufacturing device 1, a model that varies according to a volume of noise included in actual measurement values of sensor values. Thus, according to the present embodiment, even if characteristics of noise included in the time series data X vary time-sequentially, the presence or absence of anomaly can be distinguished with high accuracy from the time series data X. FIG. 9 is a schematic diagram to explain an effect of the embodiment.

According to the present embodiment, in a case as an example where model parameters obtained by performing the processes shown in FIG. 7 and FIG. 8 in an external device having the same functions as the model parameters training unit 32 is stored in the storage medium 3B, the basic network unit 31A may set each weight (connection strength) included in the neural network according to the model parameters read from the storage medium 3B. Namely, according to the present embodiment, as long as model parameters obtained through the processes shown in FIG. 7 and FIG. 8 is read by the basic network unit 31A, the model parameters training unit 32 may not be provided in the anomaly detection device 3.

Additionally, by appropriately modifying the processes, etc. related to the present embodiment, processes using other continuous probability distributions different from the multivariate Gaussian distribution N (x; μ, Σ) shown in the above equation (1) may also be performed.

The present embodiment may also be applied to other devices different from the manufacturing device 1 by appropriately modifying the configuration of the anomaly detection device 3 according to the present embodiment.

These embodiments of the present invention explained above are provided merely as examples and not intended to limit the scope of the present invention. These new embodiments may also be implemented in other various forms and incorporate various forms of omissions, replacements and changes in a range without deviating from the gist of the invention. These embodiments and modifications of these embodiments are incorporated in the scope or gist of the invention and incorporated to the equivalent extent of inventions in the scope of claims.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An anomaly detection device configured to detect presence or absence of anomaly from time series data of m (m≥1) dimensions including T (T≥2) actual measurement values obtained by actually measuring a physical quantity of a measurement object, the anomaly detection device comprising:
 a prediction unit configured to perform, at each time step of the time series data of m dimensions, a process to obtain distribution parameters required to express a continuous probability distribution representing a distribution state of predicted values that can be obtained at time step t(1≤t≤T) of the time series data of m dimensions, the prediction unit comprising:
  a basic network unit configured by using a multilayered neural network and configured to obtain output data by performing a process using, as input data, a plurality of past actual measurement values corresponding to a plurality of time steps adjacent to the time step t;
  a parameter obtaining unit configured to obtain basic parameters serving as sources of the distribution parameters by performing a process to divide the output data obtained by the basic network unit; and
  a constraints processing unit configured to obtain the distribution parameters by performing a process to confine the basic parameters obtained by the parameter obtaining unit in a domain of the continuous probability distribution; and
 an anomaly score calculation unit configured to perform, using the distribution parameters obtained by the prediction unit, a process to calculate an anomaly score corresponding to an evaluation value representing evaluation of a magnitude of anomaly in an actual measurement value at the time step t of the time series data of m dimensions.

2. The anomaly detection device according to claim 1, wherein
 the prediction unit performs a process to obtain the distribution parameters for at least one-dimensional time series data among the time series data of m dimensions when the m has a value of 2 or greater.

3. The anomaly detection device according to claim 1, wherein
 the anomaly score calculation unit performs a process to calculate a negative logarithmic likelihood of the continuous probability distribution as a process to calculate the anomaly score.

4. The anomaly detection device according to claim 1, wherein
 when the m has a value of 2 or greater and the continuous probability distribution is a multivariate Gaussian distribution, the parameter obtaining unit obtains, as the basic parameters, a mean vector of m dimensions and an m-order intermediate matrix corresponding to an m-order square matrix by performing a process to divide the output data obtained by the basic network unit; and
 when the m has a value of 2 or greater and the continuous probability distribution is the multivariate Gaussian distribution, the constraints processing unit obtains, as the distribution parameters, an m-order variance-covariance matrix obtained by performing a process to confine the mean vector of m dimensions and the m-order intermediate matrix in a domain of the multivariate Gaussian distribution.

5. The anomaly detection device according to claim 4, wherein
 the constraints processing unit performs, as a process to confine the m-order intermediate matrix in a domain of the multivariate Gaussian distribution, a process to add a Gram matrix of the m-order intermediate matrix and a matrix obtained by multiplying an m-order identity matrix by $\lambda$ ($\lambda$ is a positive real number).

6. The anomaly detection device according to claim 1, further comprising
 a model parameters training unit configured to obtain model parameters used for setting parameters of a neural network of the basic network unit by performing, using normal data corresponding to time series data including a plurality of actual measurement values obtained as a result of measurement of the physical quantity of the measurement object in a state where a device subjected to anomaly detection by the anomaly detection device operates normally, a training process corresponding to a process to repeatedly update parameters of a predetermined neural network having a network configuration identical to a network configuration of the basic network unit.

7. The anomaly detection device according to claim 6, wherein
the model parameters training unit performs, in the training process, a process to calculate, using the normal data, a gradient used for updating at least part of connection strength included in the predetermined neural network, and holds, as the model parameters, each connection strength of the predetermined neural network when a predetermined termination condition in the training process is satisfied.

8. An anomaly detection method for detecting presence or absence of anomaly from time series data of m (m≥1) dimensions including T (T≥2) actual measurement values obtained by actually measuring a physical quantity of a measurement object, the anomaly detection method comprising:
obtaining, at each time step of the time series data of m dimensions, distribution parameters required to express a continuous probability distribution representing a distribution state of predicted values that can be obtained at time step t(1≤T≤T) of the time series data of m dimensions by (a) obtaining output data from a multilayered neural network by applying, as input data to the multilayered neural network, a plurality of past actual measurement values corresponding to a plurality of time steps adjacent to the time step t, (b) obtaining basic parameters serving as sources of the distribution parameters by dividing the output data obtained from the multilayered neural network; and (c) obtaining the distribution parameters by performing a process to confine the obtained basic parameters in a domain of the continuous probability distribution, and
calculating, using the distribution parameters, an anomaly score corresponding to an evaluation value representing evaluation of a magnitude of anomaly in an actual measurement value at the time step t in the time series data of m dimensions.

9. A non-transitory storage medium storing a program executed by a computer for detecting presence or absence of anomaly from time series data of m (m≥1) dimensions including T(T≥2) actual measurement values obtained by actually measuring a physical quantity of a measurement object, the program causing the computer to execute:
a process to obtain, at each time step of the time series data of m dimensions, distribution parameters required to express a continuous probability distribution representing a distribution state of predicted values that can be obtained at time step t(1≤t≤T) of the time series data of m dimensions, the process to obtain comprising:
a process to obtain output data from a multilayered neural network by applying, as input data to the multilayered neural network, a plurality of past actual measurement values corresponding to a plurality of time steps adjacent to the time step t;
a process to obtain basic parameters serving as sources of the distribution parameters by dividing the output data obtained from the multilayered neural network; and
a process to obtain the distribution parameters by performing a process to confine the obtained basic parameters in a domain of the continuous probability distribution; and
a process to calculate, using the distribution parameters, an anomaly score corresponding to an evaluation value representing evaluation of a magnitude of anomaly in an actual measurement value at the time step t of the time series data of m dimensions.

10. The anomaly detection method according to claim 8, wherein
when the m has a value of 2 or greater and the continuous probability distribution is a multivariate Gaussian distribution, the parameter obtaining unit obtains, as the basic parameters, a mean vector of m dimensions and an m-order intermediate matrix corresponding to an m-order square matrix by performing a process to divide the output data obtained by the basic network unit; and
when the m has a value of 2 or greater and the continuous probability distribution is the multivariate Gaussian distribution, the constraints processing unit obtains, as the distribution parameters, an m-order variance-covariance matrix obtained by performing a process to confine the mean vector of m dimensions and the m-order intermediate matrix in a domain of the multivariate Gaussian distribution.

11. The non-transitory storage medium according to claim 9, wherein
when the m has a value of 2 or greater and the continuous probability distribution is a multivariate Gaussian distribution, the parameter obtaining unit obtains, as the basic parameters, a mean vector of m dimensions and an m-order intermediate matrix corresponding to an m-order square matrix by performing a process to divide the output data obtained by the basic network unit; and
when the m has a value of 2 or greater and the continuous probability distribution is the multivariate Gaussian distribution, the constraints processing unit obtains, as the distribution parameters, an m-order variance-covariance matrix obtained by performing a process to confine the mean vector of m dimensions and the m-order intermediate matrix in a domain of the multivariate Gaussian distribution.

* * * * *